J. A. DAY.
DISINTEGRATOR.
APPLICATION FILED JAN. 4, 1915.

1,203,314.

Patented Oct. 31, 1916.

Witnesses
Einar Larson
E. F. Camp

Inventor
James A. Day
By *[attorneys signature]*
Attorneys

UNITED STATES PATENT OFFICE.

JAMES ALEXANDER DAY, OF TAZEWELL, TENNESSEE, ASSIGNOR TO DAY PULVERIZER CO., OF KNOXVILLE, TENNESSEE.

DISINTEGRATOR.

1,203,314.  Specification of Letters Patent.  Patented Oct. 31, 1916.

Application filed January 4, 1915. Serial No. 407.

*To all whom it may concern:*

Be it known that I, JAMES A. DAY, a citizen of the United States, residing at Tazewell, in the county of Claiborne and State of Tennessee, have invented certain new and useful Improvements in Disintegrators, of which the following is a specification.

This invention relates to machines for disintegrating or pulverizing lime-stone and other materials, and more particularly a machine of this kind in which the material is subjected to the action of a series of rapidly-revolving beaters in a cylindrical casing.

The invention has for its object to provide, in a machine of the kind stated, a novel and improved construction and arrangement of beaters whereby a maximum efficiency is obtained, as will be described hereinafter.

In order that the invention may be better understood, reference is had to the accompanying drawing, in which—

Figure 1:
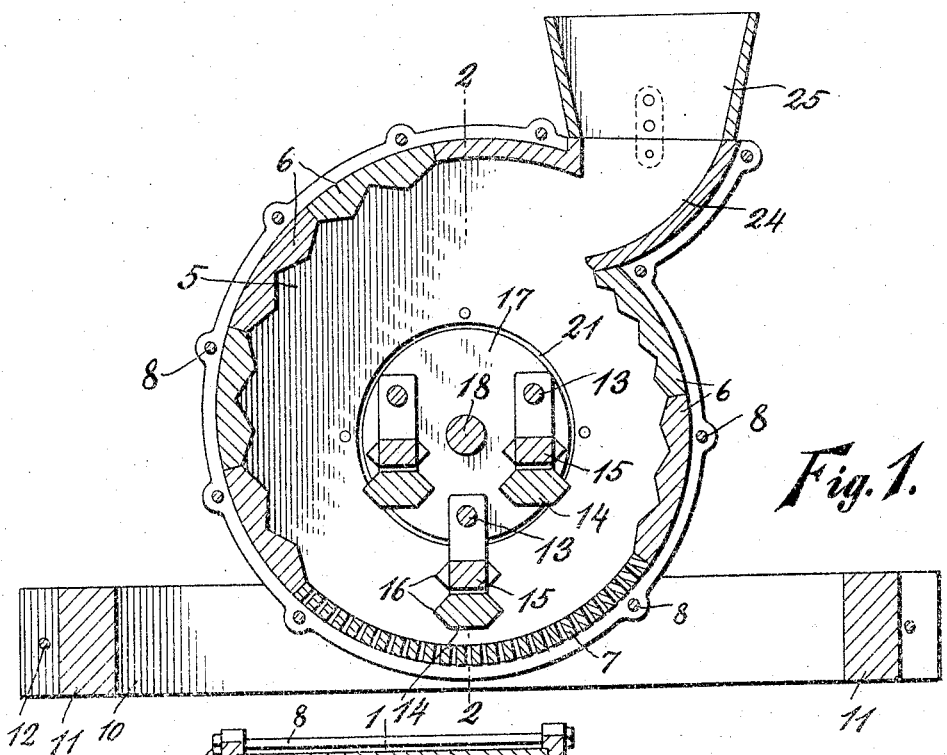
Figure 2:
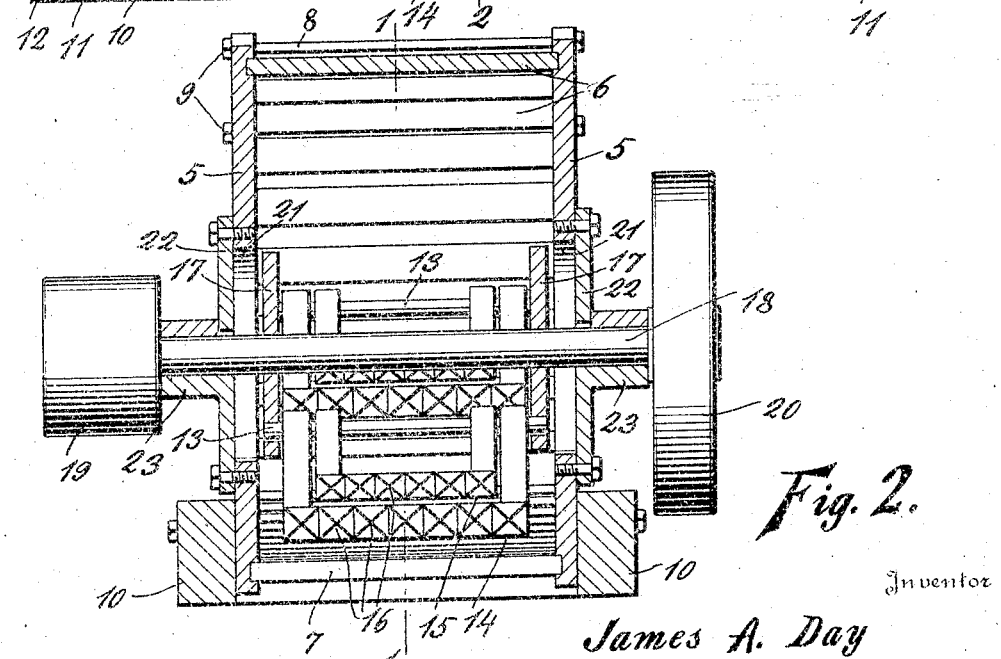

Figure 1 is a cross section of the machine on the line 1—1 of Fig. 2, and Fig. 2 is a longitudinal section thereof on the line 2—2 of Fig. 1.

Referring specifically to the drawings, the cylindrical casing of the machine is composed of end plates 5, and cross bars 6 and a grating 7 extending between said plates. In the inner faces of the end plates are grooves in which the ends of the cross bars and the grating seat, and said plates are connected by cross bolts 8, the outer edge of the plates having lugs or ears to receive the bolts, whereby the latter are located outside the parts 6 and 7. Upon tightening up the nuts 9 on one end of the bolts, the parts 5, 6 and 7 are securely clamped together. The two bolts at the bottom of the casing also serve to secure the casing to a base composed of longitudinal sills 10 connected by cross bars 11 and cross bolts 12.

The inner faces of the cross bars 6 are roughened or corrugated. The grating 7 is composed of a series of cross bars of the right length to fit between the end plates 5, and properly spaced and keyed in so that they are securely held in spaced relation. It will be noted that the space between the grate bars flares outward, which prevents clogging.

The grating 7 is located at the bottom of the casing and the cross bars 6 are located on opposite sides thereof.

The beaters are U-shaped and are hung in pairs on rods 13. Each pair of beaters comprise an outer one 14 and an inner one 15, the outer beater being larger and heavier than the inner one. Both beaters are hung on the same rod 13, the inner beater hanging inside the outer one. The working face of each beater is roughened by teeth or corrugations 16, in the shape of pyramidal protuberances which gives the beaters the breaking and crushing capacity of a large number of small hammers, but with the weight and power of a large one. The protuberances are on opposite sides of the cross bars 6, in view of which it will be seen that the bars may be reversed if the protuberances on one side are dulled or worn off. The beaters hang loose on the rods and they are spaced so as to give each a free and independent swinging action. The inturned ends of the beaters serve as shanks to support the beaters on the rods, the rods passing through said shanks. The smaller or inner beater is designed to operate on the smaller lumps of material which often, when the material is fed too fast, get through the apparent solid circle made by the rapidly-revolving outer beaters. The lumps which pass the outer beaters are caught by the inner beaters with their full force and weight, thereby relieving the strain on the outer beaters, and greately increasing the crushing or grinding action.

The rods 13 on which the beaters 14 and 15 are hung are carried by laterally spaced disks 17, between which latter the rods extend and to which they are made fast. The disks are carried by a shaft 18 on which they are made fast, said shaft being provided with a suitable drive pulley 19 and a balance wheel 20. The drive pulley will be connected to a suitable source of power.

In the end plates 5 of the casing are large circular openings 21 to permit insertion of the disks 17 and the parts carried thereby. These openings are closed by removable cover plates 22 having bearings 23 on the outside for the shaft 18.

At the top of the casing, to one side thereof, is an inlet 24 for the material to be crushed or ground, said inlet being provided with a feed hopper 25, which is bolted to the end plates 5. It will be noted that from the inlet 24 to the grating 7 the corrugated crushing surface of the casing formed by the parts 6 is eccentric to the circle described by the free ends of the beaters when they are in motion, and spaced from the beaters a sufficient distance to accommodate the material.

I claim:—

In a disintegrator, a longitudinal bar pivotally and revolubly mounted, and provided on opposite sides with pyramidal protuberances extending in a row throughout the entire length of the bar, said protuberances forming rows of integrally connected hammers on opposite sides of the bar.

In testimony whereof I affix my signature in presence of two witnesses.

JAMES ALEXANDER DAY.

Witnesses:
 FRANK MONTGOMERY,
 R. L. SHARP.